United States Patent [19]

Konstant

[11] Patent Number: 4,773,546
[45] Date of Patent: Sep. 27, 1988

[54] PALLET RACK

[75] Inventor: Anthony N. Konstant, Winnetka, Ill.

[73] Assignee: Konstant Products, Inc., Skokie, Ill.

[21] Appl. No.: 52,060

[22] Filed: May 21, 1987

[51] Int. Cl.[4] ............................................. A47F 5/00
[52] U.S. Cl. .................................... 211/151; 211/162
[58] Field of Search ................. 211/151, 162, 49.1, 211/188; 108/93; 414/276, 267, 286, 233, 235

[56] References Cited

U.S. PATENT DOCUMENTS

| | | | |
|---|---|---|---|
| 2,880,024 | 3/1959 | Hewitt | 211/162 |
| 3,399,784 | 9/1968 | Buchbinder et al. | 211/151 |
| 3,465,894 | 9/1969 | Setecha | 211/151 X |
| 4,341,313 | 7/1982 | Doring | |
| 4,462,500 | 7/1984 | Konstant et al. | |
| 4,687,404 | 8/1987 | Seiz et al. | 211/151 X |

OTHER PUBLICATIONS

Interroll Corporation-Pallet Stop Stackrail System (3 pages), 1986.
Interglide-Push Back Rack-1986, Interlake Inc. (6 pages).
Hi-Line Hipir Kart-Warehouse Storage Systems Co., Copyright 1985 (3 pages).

Primary Examiner—Reinaldo P. Machado
Assistant Examiner—Sarah A. Lechok Eley
Attorney, Agent, or Firm—George H. Gerstman; Garrettson Ellis

[57] ABSTRACT

A pallet rack discloses a pair of spaced, parallel rails, plus first and second wheeled carts mounted in rolling relation with the pair of rails. The second cart is capable of rolling over the first cart to overlie the first cart without movement-obstructing contact therewith. In accordance with this invention, each rail of the pair comprises a vertical web and a pair of generally horizontal flange portions extending outwardly in opposed directions from the web. The wheels of the carts ride on the flange portions, with the wheels of one of the carts riding on the flange portion of each rail which is opposed to the flange portions on which the wheels of the other of said carts ride. At least a portion of the web stands above the flange portions to limit the lateral movement of the wheels.

23 Claims, 2 Drawing Sheets

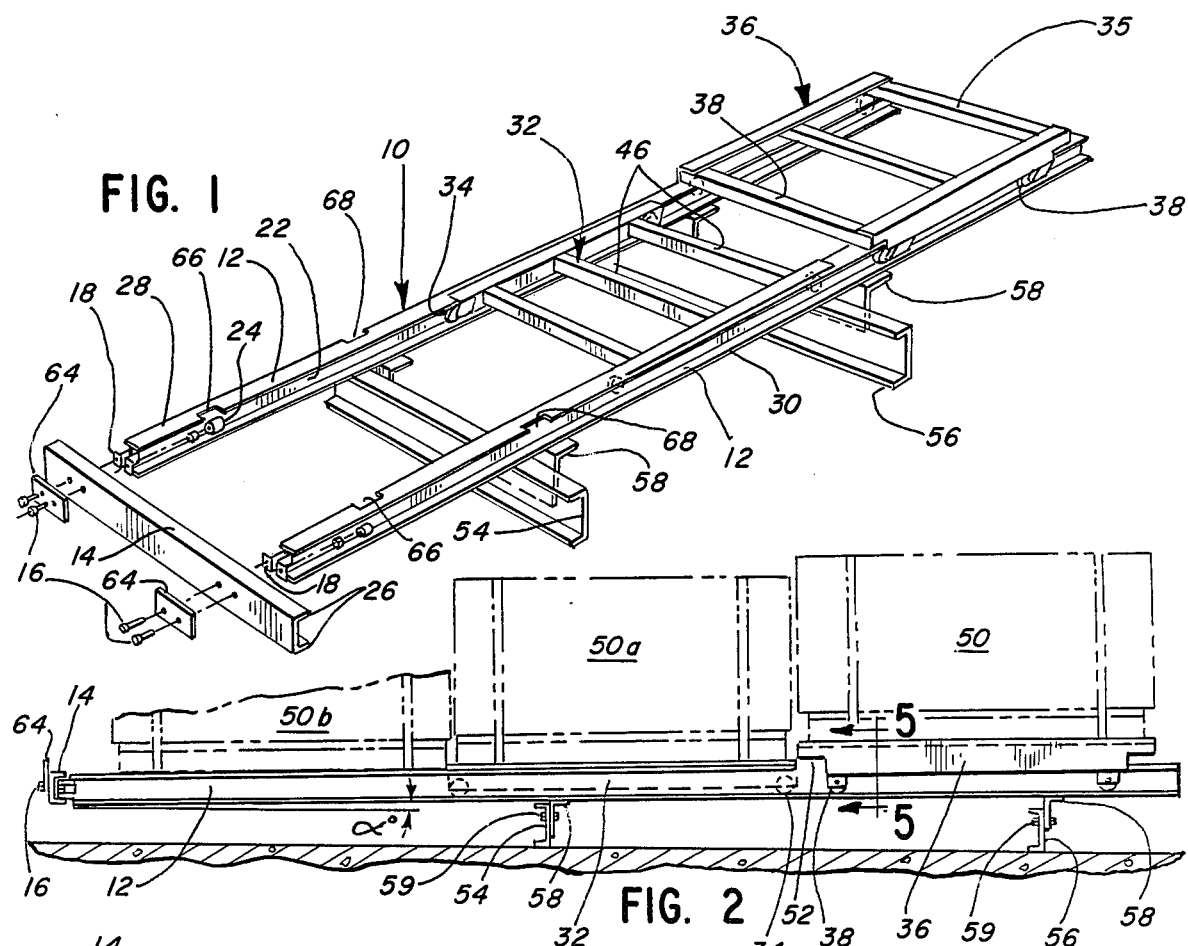
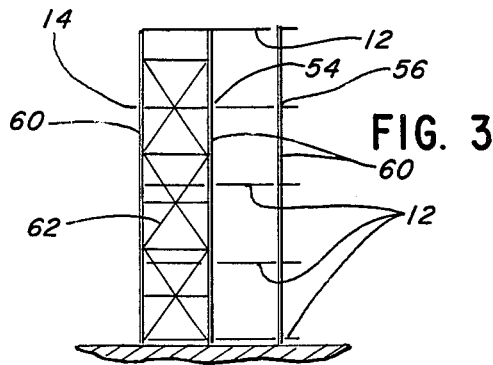
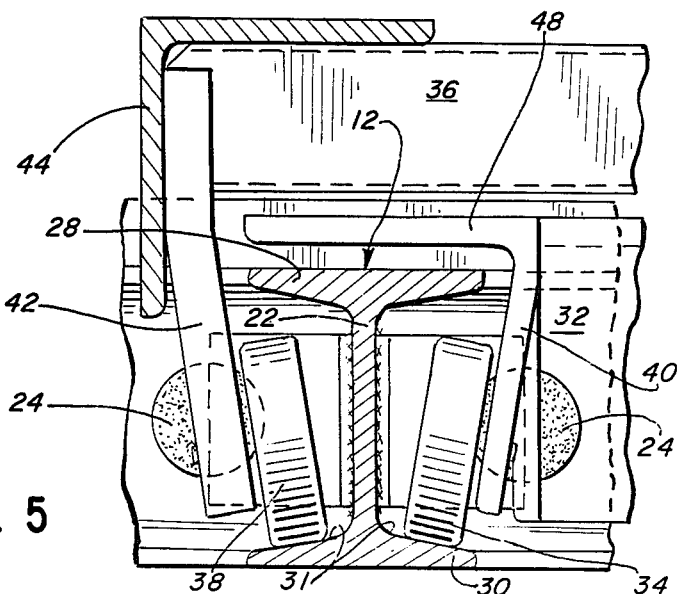

PALLET RACK

BACKGROUND OF THE INVENTION

In U.S. Pat. Nos. 4,341,313 to Doring, and 4,462,500 to Konstant for example, pallet racks are disclosed in which large pallets, carrying a load of merchandise or other goods, may be stored at a front end of the rack and then rolled rearwardly to make room for placement of another pallet and load. By such apparatus, improvements in warehouse storage procedures can be obtained, in that one may eliminate aisles which extend between storage bays, since each pallet may be installed at the front end of the bay and then moved rearwardly for storage.

When access to a rearwardly positioned pallet is desired, one may simply remove the pallets in front of it with a lift truck or the like and cause the rearwardly positioned pallet to roll to the lift truck for access. Thus such systems can have a greater storage density of pallets, when compared with prior systems.

However, the systems of the prior art exhibit certain disadvantages. For example, the Doring patent requires rolling carts for holding pallets, which carts must have flanged wheels, and which must ride on wide, unprotected surfaces.

In accordance with this invention, a pallet rack system is provided with rolling carts for holding the pallets in which the wheels of the carts are not flanged, which results in a reduction in manufacturing expense, and also permits less critical control in the control of dimensions of the wheels and their placement. Additionally, in accordance with this invention, the rails upon which the wheeled carts roll may be protected to a significantly increased extent against falling debris from the pallets and the like, so that the problem of obstructions to the free rolling of the carts is significantly reduced. Additionally, the vertical space in a stack of pallet racks in accordance with this invention may be utilized in a particularly efficient manner, for improvements in storage density.

In either of the above mentioned patents, nothing prevents the second entering load from accidentally contacting and pushing the lower cart under the upper cart, causing the second pallet to be placed on the rails. This blocks placement of the third pallet. This present invention prevents this possibility.

DESCRIPTION OF THE INVENTION

This invention relates to a pallet rack which comprises at least one pair of spaced,d parallel rails, and first and second wheeled carts mounted in rolling relation with said pair of rails. The second cart is capable of rolling over the first cart to overlie the first cart without movement-obstructing contact therewith.

In accordance with this invention, each rail of the pair of rails comprises a vertical web and a pair of generally horizontal flange portions extending outwardly in opposed directions from the web. The wheels of the carts ride on the flange portions, with the wheels of one of the carts riding on the flange portions of each rail which is opposed to the flange portions on which the wheels of the other of said carts ride. Furthermore, at least a portion of the web extends above the flange portion to limit the lateral movement of the wheels.

Preferably, an I-beam may be used to define each rail of the pair, with the central web of the cross section of each I-beam being vertically disposed, and the wheels of the carts rolling on the lower of the outwardly projecting flange portions of the I-beam.

Preferably, the surfaces of the flange portions upon which the cart wheels roll slope downwardly in the direction away from the web at a shallow angle, for example, an angle of 2-15 degrees. Accordingly, self-centering of the rolling wheels of the first and second carts is promoted as the carts roll back and forth along the rails.

The wheels of the first and second carts may be carried by brackets or the like at an angle to permit the wheels to be generally perpendicular to the sloping surfaces of the flange portions described above.

Preferably, the diameter of the wheels of the first and second carts are at least half the height of the vertical web, particularly when an I-beam is used as the rail. The upper flange of the I-beam serves as a retention member to help secure the wheels on the tracks defined by the lower flanges of the I-beam. Also, the upper flanges of the I-beam provide a measure of protection against falling debris to keep it from landing on the lower flange portions, where it can interfere with the rolling of the carts along the track.

Additionally, the opposed upper flanges of the rails (present when an I-beam construction is used, for example), may each define cut-away portions to permit insertion and removal of wheels of the first and second carts through the upper flanges into or out of rolling engagement with the flange portions upon which the wheels roll.

It is also preferred for at least one of the carts to define bracket means holding the wheels of the cart. These bracket means, in turn, define horizontally disposed flange portions which extend over said wheels and rails to divert spills and falling debris from the wheels and rails, such debris possibly coming from pallets as they are loaded and unloaded from the cart. Also, such horizontally disposed flanges can serve to widen the load-carrying area of the cart which carries it.

It is preferred for the pair of rails to define a front end, with a crossbar securing the rails together at the front end, and resilient bumper means carried by the crossbar to cushion the stopping shock of the carts arriving at the front end from rear portions of the rails. It is generally preferred for the rails to be sloped upwardly at a slight angle from the front end so that the respective carts are naturally biased to roll toward the front end, unless pushed or held rearwardly.

It is also preferred for a stack of pairs of rails in accordance with this invention to be provided, each of said rails pairs supporting first and second carts, the rail pairs being vertically spaced by a distance permitting them to receive pallets on said carts. The pairs of rails may each be supported by crossbeam means, with the crossbeam means being spaced from the front end (described above) by a distance that exceeds the length of the longest cart on the rails. Thus, the crossbeam of a track pair which is above a lower track pair does not interfere with the insertion of loads onto carts into rolling relation with the lower track pair. Hence, the vertical spacing of the track pairs may be reduced to a certain degree because of this, for added efficiency of storage density.

Also, pallet retainer plates may be provided on the front of the rack of this invention to prevent the second pallet added to the rack, which is supposed to rest on the lower cart, from accidentally engaging the lower cart to drive it rearwardly and instead rest on the rails rather than the lower cart. This, of course, would prevent a third pallet from being placed on the rails, so that undesirable happening is prevented by the pallet retainer plates.

Additionally, the upper cart may define front cut-out means that permit it to extend in its forwardmost position forwardly of the lower cart. This provides the first cart with extra visibility, particularly those on the higher rails in a stack of racks, so that the user can avoid the similar problem of accidentally engaging the upper cart with the first pallet to push it back without resting the first pallet on it.

DESCRIPTION OF DRAWINGS

In the drawings,

FIG. 1 is a partially exploded perspective view of a pallet rack in accordance with this invention showing a single pair of spaced, parallel rails and the first and second wheeled carts carried thereon.

FIG. 2 is an elevational view of the pallet rack of FIG. 1.

FIG. 3 is a reduced-sized, elevational view of a vertical stack of pallet racks, each being similar to that shown in FIG. 1.

FIG. 5 is a sectional view taken along line 5—5 of FIG. 2.

DESCRIPTION OF SPECIFIC EMBODIMENT

Figure 4:
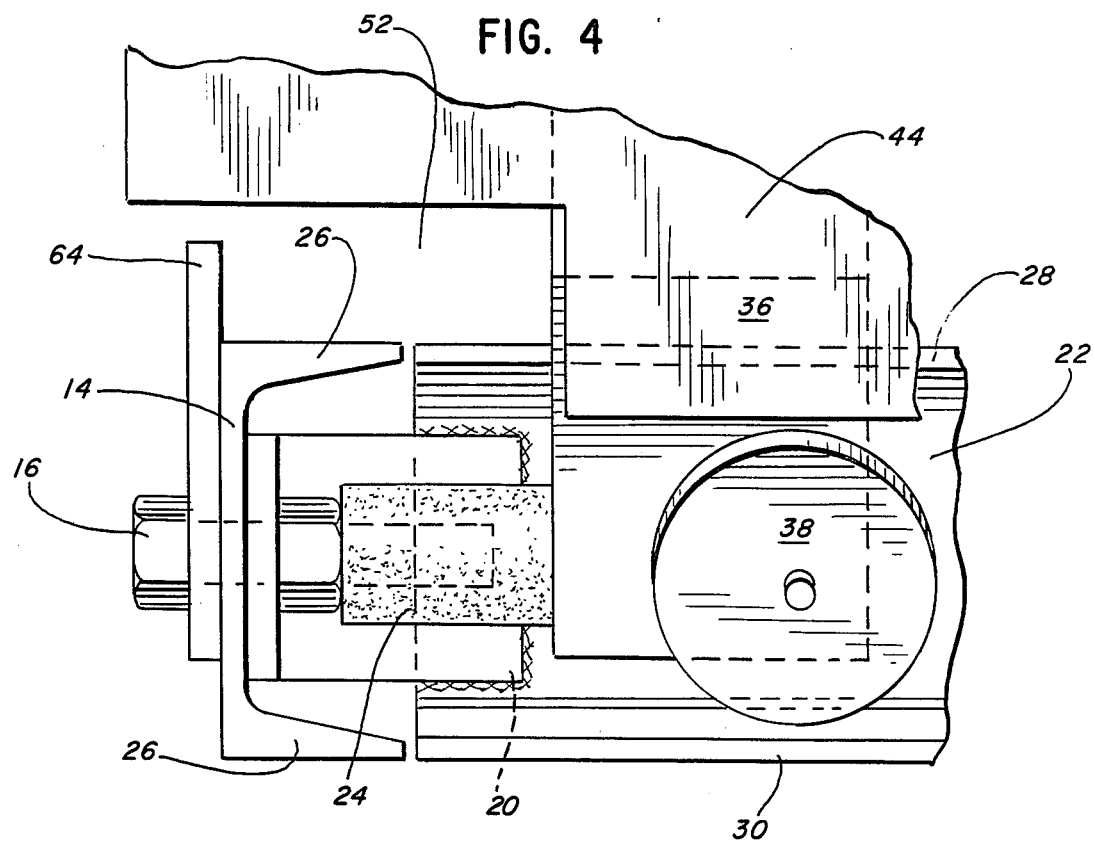
FIG. 4 is an enlarged, fragmentary elevational view of the front end of the pallet rack of FIG. 2.

Referring to the drawings, the pallet rack 10 of this invention comprises at least one pair of parallel rails 12, which are shown to be of I-shaped cross section and may be conventional I-beams. Spaced rails 12 are connected at their front ends to cross beam 14 by bolts 16 which attach to generally angle-shaped brackets 18 at the end of each rail 12. Angle-shaped brackets 18 are welded to web 22 of each of I-beam rails 12. At shown particularly in FIG. 1, each of bolts 16 may carry at its inner end a tubular rubber bumper 24 to serve as a shock absorber.

Cross beam 14 is shown to be of U-shaped cross section, with the respective arms 26 of the U-shaped cross section being in generally coplanar relation with upper flange 28 and lower flange 30 of the I-beam rail 12.

Rails 12 carry, in rolling relation therewith, lower cart 32 having wheels 34, and upper cart 36 having wheels 38. As shown in FIG. 5, wheels 34, 38 can be seen to rest on oppositely facing portions of lower flange 30. Wheels 34 are each carried by the offset portion of the vertical leg of angle iron 44, which is part of lower cart 32, while wheels 38 are carried by a bracket 42, which, in turn, is attached to upper cart 36. Angle iron 44 may be provided to run along the edge of upper cart 36 to provide a load bearing surface as shown, while cross pieces 46 make up the remainder of lower cart 32, and cross pieces 35 the remainder of upper cart 36.

With lower cart 34, angle iron 40 may include a laterally extending flange portion 48, which may serve as a load bearing surface upon which pallets may rest. Each flange portion 48 may be seen to extend over its respective associated rail 12 to provide a measure of protection of the rolling surfaces of the rail against falling debris and the like from the pallets which might interfere with the rolling action of carts 32 and 36.

As shown in FIG. 2, each of upper cart 36 and lower cart 32 are shown to be carrying a pallet 50 which is shown in phantom lines.

Figure 6:
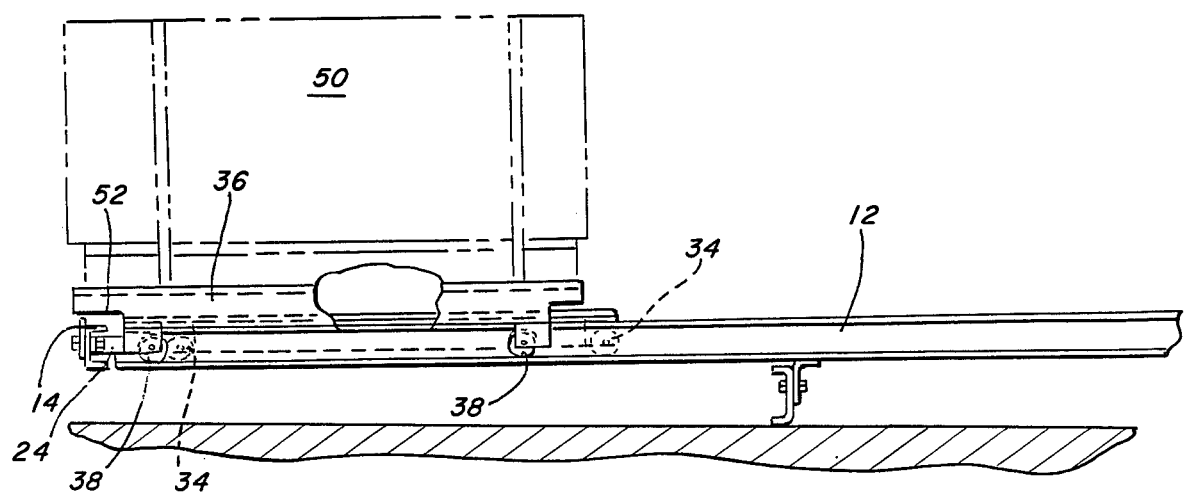
FIG. 6 is an elevational view of the pallet rack of FIG. 2 showing the respective carts in their forward position.

As shown in FIG. 6, in the unloaded position, carts 32, 36 of the pallet rack naturally occupy their forwardmost position because of the slight upward slope of rails 12 (for example, 0.5 to 4 degrees) from the forward end where the rails engage crossbeam 14. This, of cours, causes carts 32, 36 to naturally roll toward the front end. It can be seen that cut out portion 52 is provided in upper cart 36 to permit cart 36 to advance forwardly beyond crossbeam 14, so that upper cart 36 is advanced over lower cart 32. Thus they do not completely overlap each other in their normal position.

One places a pallet 50 on cart 36 with a forklift truck or the like for storage. Thereafter, when it is desired to store another pallet on the same track, one simply brings the pallet into position, pushing pallet 50 and upper cart 36, causing upper cart 36 to roll rearwardly. One then deposits the second pallet 50a on lower cart 32, with the result that upper cart 36 is held in its rearward position by the gentle engagement of the two pallets.

Finally, to fill the pallet rack, a forklift truck may bring a third pallet 50b, pressing it against pallet 50a, which cause both carts 32 and 36 to roll rearwardly, permitting pallet 50b to be placed directly on rails 12.

Thus, three separate pallets may be conveniently stored in a single pallet rack in accordance with this invention, with rolling carts that provide relatively good protection to the rolling surfaced, (i.e. the lower flange 30) of rails to minimize the problem of getting the carts "hung up" by debris that lands on the rail and jams in the rollers.

Additionally, as shown particularly in FIG. 5, the rolling surfaces 31 of lower flanges 30 upon which wheels 34, 38 roll preferably slope downwardly in the direction away from central web 22 of the preferably I-beam rails 12 at a shallow angle. This shallow angle is preferably 4 to 15 degrees, specifically, about 9.5 degrees.

It can also be seen that the respective brackets 40, 42 which hold wheels 34, 38 are angled to permit wheels 34, 38 to be in generally perpendicular relation with angled surfaces 31. A desired effect of this structure is that the rolling carts tend to be self-centering as they roll, so that they remain spaced from central web 22 for the most part, and also do not tend to fall off the rolling surface 31 of lower flange 30. As the result of this, the structure of this invention provides carts that roll more smoothly and with less rolling "hand-up" difficulty, even under the heavy loads imposed by the pallets they carry.

Rails 12, as shown particularly in FIG. 2, are supported by crossbeam 14 at its forward end, and also by added crossbeams 54, 56, which may be attached to each rail by bolting connection with brackets 58, which may be welded to each rail. It can be seen that the bracket 58 that attaches to beam 56 is slightly higher than the bracket 58 attached to beam 54, to provide the slight upward slope desired for rails 12. This is accomplished by vertical slots in brackets 58, so that their vertical position may be adjusted prior to tightenting of retention bolts 59.

Upper flanges 28 on rails 12 serve to prevent the carts 34, 36 from tipping too much as they are being loaded or unloaded, to avoid derailment.

Referring to FIG. 3, a stack of the pallet racks in accordance with this invention is shown in generally schematic manner. The various pairs of rails 12 are shown, being supported by vertical columns 60 which, in turn, carry the respective crossbeams 14, 54, and 58 for each pair of rails. Added structural members 62 may be included as desired for strengthening of the system, to provide a multiple level pallet rack of rail pairs, each carrying upper and lower carts 32, 36, with each set of rails and respective carts being designed and used in accordance with this invention as described herein with respect to the single pair of rails 12.

Pallet retainer plate members 64 (FIGS. 1 and 4) are provided to engage a pallet 50a on second cart 32 and third pallet 50b, when present. As pallet 50b which sits on rails 12 is emptied, the lateral pressure provided by the weight of pallets 50a and 50, resting on the rolling carts 32, 36 on inclined rails 12, could force the lightened pallet 50b forwardly off of the rails out of the rack, but for the presence of pallet retainer plate members 64, which serve to restrain such motion.

Simiarly, if pallet 50b is not present, the weight of pallet 50 might cause lateral slippage of pallet 50a in the forwardmost position of the carts, but for the presence of pallet retainer plate members 64.

The upper flanges 28 of rails 12 are shown to define cut-away portions 66 on the inside position relative to webs 22 of rails 12, while slots 68 are positioned exterior to webs 22. The purpose of these cut-away portions is to permit insertion of the wheels of the first and second carts through the upper flanges 28 into rolling engagement with the flange portions 30 as shown in FIG. 5. Thus, carts 32 and 36 may be inserted and removed through the respective cut-away portions 66, 68.

It should be noted that particularly in a stacked configuration of rails as shown in FIG. 3 the central crossbeams 54 are spaced from the front end of rails 12 by a distance that exceeds the length of the longest cart on the rails. This permits the vertical spacing of the various stacked rails to be closer together, since central crossbeam 54 is spaced rearwardly of the area that each load occupies as it is inserted into the rack and then lowered into position.

Accordingly, a pallet rack in accordance with this invention is provided in which the rolling characteristics of the cart on the rails is improved, with less possibility of the wheels jamming on debris that has been dropped and the like becasue of the protective features provided, and in which the carts exhibit a self-centering characteristic which reduces binding of the wheels against the central web of the rails, and also derailment, in a spontaneous, natural manner. Simple, common, non-flanged wheels may be used while obtaining reliable and effective functioning for the storage for multiple pallets.

Also, accidental pushing of lightened pallets out of the rack can be avoided, plus accidental misplacement of pallets which results in loss of a storage space in the rack of this invention.

The above has been offered for illustrative purposes only, and is not intended to limit the scope of this application, which is as defined in the claims below.

That which is claimed is:

1. In a pallet rack which comprises at least one pair of spaced, parallel rails, and first and second wheeled carts mounted in rolling relation with said pair of rails and defining a load-carrying area, said second cart being capable of rolling over said first cart to overlie said first cart without movement-obstructing cantact therewith, the improvement comprising, in combination:

each rail of said pair comprising a vertical web and a pair of generally horizontal flange portions having upper surfaces extending outwardly in opposed directions from said web, the wheels of said carts riding on said flange portions, the wheels of one of said carts riding on flange portions of each rail which are opposed to the flange portions on which the wheels of the other of said carts ride, at least a portion of said web extending above said flange portions to limit lateral movement of said wheels.

2. In a pallet rack which comprises at least one pair of spaced, parallel rails, and first and second wheeled carts mounted in rolling relation with said pair of rails and defining a load-carrying area, said second cart being capable of rolling over said first cart to overlie said first cart without movement-obstructing contact therewith, the improvement comprising, in combination:

each rail of said pair comprising a vertical web and a pair of generally horizontal flange portions having upper surfaces extending outwardly in opposed directions from said web, the wheels of said carts riding on said flange portions, the wheels of one of said carts riding on the upper surface of each flange portion which is opposed to the flange portion on which the wheels of the other of said carts ride, at least a portion of said web extending above said flange portions to limit lateral movement of said wheels, the upper surfaces of said flange portions sloping downwardly in a direction away from said web at a shallow angle, whereby self-centering of rolling wheels of said first and second carts is promoted.

3. The pallet rack of claim 2 in which the wheels of said first and second carts are carried by brackets at an angle to permit said wheels to be generally perpendicular to said surfaces of the flange portions.

4. The pallet rack of claim 1 in which each rail is of I-shaped cross-section.

5. The pallet rack of claim 4 in which the diameters of the wheels of said first and second carts are at least half the height of said vertical web.

6. The pallet rack of claim 4 in which each rail has opposed upper flanges at the top of said web as part of said I-shaped cross section, said opposed upper flanges each defining cut-away portions to permit insertion of wheels of said first and second carts through said upper flanges into rolling engagement with said flange portions.

7. The pallet rack of claim 1 in which said rails define a pallet loading end, and slope upwardly at a shallow angel from said end.

8. The pallet rack of claim 1 in which at least one of said carts defines bracket means holding the wheels of said cart, said bracket means defining horizontally disposed flange portions which extend over said wheels and rails to divert spills and falling debris from said wheels and rails, and which serves to widen the load-carrying area of said cart.

9. The pallet rack of claim 1 in which said pair of rails defines a front end, a crossbar securing said rails together at said front end, and resilient bumper means carried by said crossbar to cushion the stopping shock of carts arriving at said front end.

10. The pallet rack of claim 9 in which a stack of said pairs of rails is provided, each rail pair supporting first and second carts on each pair of rails and vertically spaced to receive pallets on said carts, said pairs of rails being each supported by crossbeam means, said crossbars means being spaced from said front end by a distance that exceeds the length of the longest cart on said rails.

11. The pallet rack of claim 9 in which the second carts defines forwardly positioned cut-out portions to permit said second cart to roll forwardly beyond said first cart.

12. The pallet rack of claim 9 in which said front end carries pallet retainer member means to limit the forward motion of pallets which rest on said rails or said first cart.

13. The pallet rack of claim 1 in which each rail is of I-shaped cross section, each rail having opposed upper flanges at the top of said web as part of said I-shaped cross section, said upper flanges preventing excessive tipping of said carts to prevent derailment.

14. In a pallet rack which comprises at least a pair of spaced, parallel rails, and first and second wheeled carts mounted in rolling relation with said pair of rails, said carts each defining a load-carrying area, said second cart being capable of rolling over said first cart to overlie said first cart without movement-obstructing contact therewith, the improvement comprising, in combination:

each rail being of I-shaped cross section comprising a central web which is generally vertically disposed with generally horizontal upper and lower flange portions extending outwardly in opposed directions from opposed ends of said web, the wheels of said first and second carts riding on the opposed lower flange portions of each rail, the upper surfaces of said opposed lower flange portions sloping downwardly in the direction away from said web at a shallow angle, whereby self centering of rolling wheels of said first and second carts is promoted.

15. The pallet rack of claim 14 in which the wheels of said first and second carts are carried by brackets at an angle to permit said wheels to be generally perpendicular to said sloping surfaces of the flange portions.

16. The pallet rack of claim 15 in which said pair of rails defines a front end, a crossbar securing said rails together at said front end, and resilient bumper means carried by said crossbar to cushion the stopping shock of carts arriving at said front end.

17. The pallet rack of claim 16 in which a stack of said pairs of rails are provided, supporting first and second carts on each pair of rails, and vertically spaced to receive pallets on said carts.

18. The pallet rack of claim 17 in which said pairs of rails are each supported by crossbeam means, said crossbeam means being spaced from said front end by a distance that exceeds the length of the longest cart on said rails, the opposed upper flanges of the I-shaped cross section of said rails each defining cut-away portions to permit insertion of wheels of said first and second carts through said upper flanges into rolling engagement with said flange portions, said cut-away portions being positioned toward said front end from said crossbeam means.

19. The pallet rack of claim 18 in which said rails define a pallet loading end, and slope upwardly at a shallow angle from said end.

20. The pallet rack of claim 19 in which the brackets carrying the wheels of said second cart define horizontally disposed flange portions which extend over said wheels and rails to divert spills and falling debris from said wheels and rails, and which serves to widen said load carrying area of said cart.

21. The pallet rack of claim 20 in which the diameters of the wheels of said first and second carts are at least half the height of the vertical web of the rail.

22. The pallet rack of claim 20 in which the second cart defines forwardly positioned cut-out portions to permit said second cart to roll forwardly beyond said first cart.

23. The pallet rack of claim 20 in which said front end carries pallet retainer member means to limit the forward motion of pallets which rest on said rails or said first second cart.

* * * * *